(12) United States Patent
Reid et al.

(10) Patent No.: US 10,152,035 B2
(45) Date of Patent: Dec. 11, 2018

(54) VALUE ADDED PEST CONTROL SYSTEM WITH SMART LEARNING

(71) Applicant: Bayer AG, Leverkusen (DE)

(72) Inventors: Byron Reid, Raleigh, NC (US); Volker Gutsmann, Langenfeld (DE); Michael Zimmermann, Raleigh, NC (US); Chris Pienaar, Chapel Hill, NC (US); Gaelle Fages, Chapel Hill, NC (US); Peter Jardine, Wake Forest, NC (US)

(73) Assignee: BAYER AG, Leverkusen (DE)

( * ) Notice: Subject to any disclaimer, the term of this patent is extended or adjusted under 35 U.S.C. 154(b) by 0 days.

(21) Appl. No.: 15/485,838

(22) Filed: Apr. 12, 2017

(65) Prior Publication Data

US 2018/0299842 A1    Oct. 18, 2018

(51) Int. Cl.
G05B 13/02    (2006.01)
A01M 25/00    (2006.01)
A01M 1/20     (2006.01)

(52) U.S. Cl.
CPC .......... G05B 13/0275 (2013.01); A01M 1/20 (2013.01); A01M 25/00 (2013.01)

(58) Field of Classification Search
None
See application file for complete search history.

(56) References Cited

U.S. PATENT DOCUMENTS

| | | | |
|---|---|---|---|
| 4,862,145 A | 8/1989 | Meehan et al. | |
| 4,937,555 A | 6/1990 | Litzkow et al. | |
| 5,005,416 A | 4/1991 | Vick et al. | |
| 5,040,326 A | 8/1991 | Van Dijnsen et al. | |
| 5,473,942 A | 12/1995 | Vick et al. | |
| 5,571,967 A | 11/1996 | Tanaka et al. | |
| 5,646,404 A | 7/1997 | Litzkow et al. | |
| 5,815,090 A | 9/1998 | Su | |
| 6,052,066 A | 4/2000 | Su | |
| 6,055,766 A | 5/2000 | Nolen et al. | |
| 6,150,944 A | 11/2000 | Martin et al. | |
| 6,339,897 B1 | 1/2002 | Hayes et al. | |
| 6,385,544 B1 | 5/2002 | Mafra-Neto | |
| 6,445,301 B1 | 9/2002 | Farrell et al. | |
| 6,493,363 B1 | 12/2002 | Shuman et al. | |
| 6,669,105 B2 | 12/2003 | Bryan et al. | |
| 6,766,251 B2 | 7/2004 | Mafra-Neto et al. | |
| 6,775,946 B2 | 8/2004 | Wright et al. | |
| 6,792,395 B2 | 9/2004 | Roberts et al. | |
| 6,882,279 B2 | 4/2005 | Shuman et al. | |
| 6,923,064 B2 | 8/2005 | Rodriguez et al. | |
| 6,926,211 B2 | 8/2005 | Bryan et al. | |

(Continued)

FOREIGN PATENT DOCUMENTS

WO    2014125158 A1    8/2014
WO    2017011916 A1    1/2017

*Primary Examiner* — Jason Lin
(74) *Attorney, Agent, or Firm* — McBee Moore Woodward & Vanik IP, LLC; Susan McBee

(57) ABSTRACT

The instant disclosure provides an ability to use an array of data inputs to enter a network and thereby provide a realtime improvable database. The present invention is novel in its ability to maximize the customer's interface with a pest control system, thus allowing for maximum efficiency for current and future designs as well as a high level of compatibility with ancillary regulatory, financial and planning type functions.

13 Claims, 7 Drawing Sheets

(Example 2: Optimization of Pest Management in Relation to Insights)

(56) References Cited

U.S. PATENT DOCUMENTS

| | | |
|---|---|---|
| 6,937,156 B2 | 8/2005 | Gardner et al. |
| 6,947,810 B2 | 9/2005 | Skinner et al. |
| 7,020,996 B2 | 4/2006 | Beroza et al. |
| 7,026,924 B2 | 4/2006 | Degrauwe et al. |
| 7,026,942 B2 | 4/2006 | Cristofori et al. |
| 7,066,218 B1 | 6/2006 | Fleming et al. |
| 7,069,188 B2 | 6/2006 | Roberts |
| 7,071,829 B2 | 7/2006 | Gardner et al. |
| 7,090,147 B2 | 8/2006 | Lovett |
| 7,212,112 B2 | 5/2007 | Barber et al. |
| 7,218,234 B2 | 5/2007 | Tirkel et al. |
| 7,271,706 B2 | 9/2007 | Lee et al. |
| 7,286,056 B2 | 10/2007 | Kates |
| 7,295,898 B2 | 11/2007 | Lovett et al. |
| 7,317,399 B2 | 1/2008 | Chyun et al. |
| 7,395,161 B2 | 7/2008 | David et al. |
| 7,496,228 B2 | 2/2009 | Landwehr et al. |
| 7,504,956 B2 | 3/2009 | Kates |
| 7,506,547 B2 | 3/2009 | Jesmonth |
| 7,509,770 B2 | 3/2009 | Gardner et al. |
| 7,530,195 B2 | 5/2009 | Mueller et al. |
| 7,540,433 B2 | 6/2009 | Fleming et al. |
| 7,656,300 B2 | 2/2010 | Roennau |
| 7,916,951 B2 | 3/2011 | Landwehr et al. |
| 8,026,822 B2 | 9/2011 | Borth et al. |
| 8,078,711 B2 | 12/2011 | Jiang et al. |
| 8,139,858 B1 | 3/2012 | Landwehr et al. |
| 8,156,683 B2 | 4/2012 | Slotnick et al. |
| 8,258,966 B2 | 9/2012 | Wright et al. |
| 8,365,995 B2 | 2/2013 | Jiang et al. |
| 8,400,348 B1 | 3/2013 | Guice et al. |
| 8,417,534 B2 | 4/2013 | Belzer et al. |
| 8,448,377 B1 | 5/2013 | Price et al. |
| 8,504,234 B2* | 8/2013 | Anderson ............. A01G 1/00 701/24 |
| 8,599,026 B2 | 12/2013 | Lloyd et al. |
| 8,635,806 B2 | 1/2014 | Gardner et al. |
| 8,830,071 B2 | 9/2014 | Borth et al. |
| 8,868,221 B1* | 10/2014 | Mealy ............. G05B 13/027 700/117 |
| 8,872,666 B2 | 10/2014 | Klute |
| 8,896,452 B2 | 11/2014 | Oppenheimer et al. |
| 8,984,804 B2 | 3/2015 | Borth |
| 8,994,529 B2 | 3/2015 | White |
| 9,015,987 B2 | 4/2015 | Moran et al. |
| 9,179,665 B2 | 11/2015 | Fromjmovics |
| 9,357,759 B2 | 6/2016 | Anderson |
| 9,357,760 B2 | 6/2016 | Anderson |
| 9,380,775 B2 | 7/2016 | Frojmovics |
| 2001/0009399 A1* | 7/2001 | Barber ............. A01M 1/026 340/573.2 |
| 2002/0107639 A1 | 8/2002 | Mafra-Neto |
| 2002/0144452 A1 | 10/2002 | Beroza |
| 2003/0160699 A1 | 8/2003 | Trompen et al. |
| 2004/0216364 A1 | 11/2004 | Gosselin et al. |
| 2005/0125260 A1 | 6/2005 | Green et al. |
| 2005/0151653 A1 | 7/2005 | Chan et al. |
| 2006/0265941 A1 | 11/2006 | Newton |
| 2007/0193109 A1 | 8/2007 | Chyun |
| 2008/0092431 A1 | 4/2008 | Fritzboger |
| 2008/0204253 A1 | 8/2008 | Cottee et al. |
| 2008/0236023 A1 | 10/2008 | Thomas et al. |
| 2010/0115826 A1 | 5/2010 | Kerr |
| 2010/0286003 A1 | 11/2010 | Al-Ahmad |
| 2012/0042563 A1* | 2/2012 | Anderson ............. A01G 1/00 43/132.1 |
| 2013/0047497 A1 | 2/2013 | White |
| 2013/0204581 A1 | 8/2013 | Park et al. |
| 2013/0293710 A1 | 11/2013 | Afanasyev et al. |
| 2013/0342344 A1 | 12/2013 | Kramer et al. |
| 2014/0085100 A1 | 3/2014 | Rich et al. |
| 2014/0279600 A1* | 9/2014 | Chait ............. G06Q 30/018 705/317 |
| 2014/0283435 A1 | 9/2014 | Galeb |
| 2014/0300477 A1 | 10/2014 | Rich et al. |
| 2014/0325892 A1 | 11/2014 | Borth et al. |
| 2014/0331544 A1 | 11/2014 | Azzarello et al. |
| 2015/0150236 A1 | 6/2015 | Grant |
| 2015/0157003 A1 | 6/2015 | White et al. |
| 2015/0196002 A1* | 7/2015 | Friesth ............. A01G 1/001 47/62 R |
| 2015/0208636 A1 | 7/2015 | David et al. |
| 2015/0216158 A1 | 8/2015 | Mizrach et al. |
| 2016/0016128 A1 | 1/2016 | Cink et al. |
| 2016/0021867 A1 | 1/2016 | Frojmovics |
| 2016/0025652 A1 | 1/2016 | Go et al. |
| 2016/0070010 A1 | 3/2016 | Calupca et al. |
| 2016/0150744 A1 | 6/2016 | Lin et al. |
| 2016/0023873 A1 | 8/2016 | Janet et al. |
| 2016/0219858 A1 | 8/2016 | Cink et al. |
| 2016/0235050 A1 | 8/2016 | Janet et al. |
| 2016/0378086 A1* | 12/2016 | Plymill ............. G08B 13/18 700/284 |

\* cited by examiner

Sensor 1.3, Processing Plant

Trap Installed: Cockroach Trap
Installation Date: 10/01/2016
Installer: John Doe
Maintenance Date: N/A
Killing Agent: Pesticide, Fipronil
Dosage: 120mg
Attractant: NAF430 gel bait
Manufacturer: Raid Alerts:
10/20/2016 at 11:18: Overflow of Trap
This trap needs service. The threshold for number of pests/hour was exceeded.

Action:
A service request was automatically generated and sent at 11:18 on 10/20/2016 to the pest control operator. It is suggested to increase the dosage 5mg at trap at sensor 1.3 and to add a new identical trap within 5m of existing trap.

FIGURE 5

(Example 1: Optimization of Pest Monitoring in Relation to Insights)

(Example 2: Optimization of Pest Management in Relation to Insights)

VALUE ADDED PEST CONTROL SYSTEM WITH SMART LEARNING

BACKGROUND

1. Field

The present invention is a logic-based pest control management system that includes machine learning so that in real time, optimal performance of one or more pest control platforms can be achieved. More particularly, the present invention generates and maintains a database that is capable of machine learning so as to achieve optimal placement and type of pest control platforms for a location during use or even as a design of a pest control system before implementation. The output of this management system can optimize the pest control system design but also display historical and machine-learned recommendations on a platform that is useful to facility owners, pest control operators, auditors, and/or customers.

2. Description of Related Art

U.S. Pat. No. 4,682,145, U.S. Pat. No. 6,792,395, U.S. Pat. No. 6,937,156, U.S. Pat. No. 7,395,161, U.S. Pat. No. 7,656,300, U.S. Pat. No. 8,830,071 relate to pest monitoring devices and/or systems with specific consideration of using hardware and/or software integrations such that pest presence, especially rodents, can be made more readily known to the end user.

U.S. Pat. No. 4,682,145 has mention of a pest monitoring apparatus that are digitally linked to observe presence of pests, especially rodents, from one central location. The '145 patent uses a connected system of detectors to transmit a unique signal to a receiver to determine if and at what detector a pest is located. U.S. Pat. No. 6,792,395 uses remote detection and monitoring a hardware and software interface to send data that is sensed (e.g. pressure, camera, moisture) via electrical signal to a computer server system; it also includes the software interface to display the results of said signal. U.S. Pat. No. 6,937,156 is a detector and/or trap that includes a capacitance sensing circuit to create a signal to be transmitted as an output to notify a likely scenario that a pest has entered a monitored area. U.S. Pat. No. 7,395,161 makes use of a polymodal sensors to collect data on a server network for analysis. The '161 patent considers use of a biological pest expert to examine the data with the intent to reposition the sensors and/or traps to improve the system. U.S. Pat. No. 7,656,300 relates to the digitizing of all aspects to monitoring pests with the intent to automate the system as best as possible. The '300 patent attempts to monitor pests, specifically rodents, by transmitting a signal from the detectors to local or remote communication servers to output an alarm and/or log registration which utilizes infrared temperature and/or movement sensors, mechanical tripping sensors, or optical sensors to detect and communicate the presence of a rodent. U.S. Pat. No. 8,830,071 relates to the wireless transmission of information from each pest detector. The '071 patent uses a wireless communication circuit and a radio frequency receiver, providing the data collector as a form of gateway to allow user interface of the gathered data.

Some published US patent applications include a description of smart data for agricultural use. For example, US 2016/0150744 published Jun. 2, 2016 discloses a system for applying a pesticide to a crop, comprising a trap and counter device generating information of an insect amount, and sending the insect amount information via a communication network. The data collecting platform gathers environmental parameter information and the insect amount information via the communication network. There is also provided a data analyzing platform analyzing historical monitoring data. The environmental parameter information and the insect amount information are also used to generate a control criterion; and a pesticide-applying control device is used to control the amount of the pesticide to be applied to the crop based on the control criterion. The '744 application thus utilizes information regarding what pests are present in order to determine what pesticide should be applied in real time.

In another published application, US 2015/0208636 published Jul. 30, 2015, there is described a method of detecting a biological activity condition, comprising: positioning one or more polymodal sensors that detect data relating to at least two conditions in at least one zone; accumulating the data in at least one data collector to generate a local knowledge base. The '636 application is focused on a fairly complex polymodal system which requires detection of at least two parameters to determine the presence of a biological activity which then in turn causes the system to react accordingly to treat the pest.

BRIEF SUMMARY OF THE INVENTION

In each of the prior art, the main objective is to sense the presence of a pest and notify a management system with the attempt to quickly observe where the pests are. The present invention, on the other hand, relates to the use of signals from digital sensors being wirelessly communicated over a network to a database for observation coupled with the ability to use this data for a multitude of purposes; namely, the use of this data for analysis of current systems for improved pest control designs and future types and designs of pest control systems given environmental and/or structural constraints. The instantly described technology allows for the constant and autonomous improvement of current and future pest control systems. There is a need to collect and analyze data in a pest control application so that from a central location, the type and number or density of pests is known, but also to utilize that historical data to make more educated decisions regarding placement and types of pest traps, types of chemical or pest control agent and dosage rates, and overall system status. Further, this machine learning infrastructure would drive future pest control management system design by analyzing other system designs in combination with external factors (i.e. environmental conditions). The present invention utilizes specific type of sensor to collect and transmit relevant data to a signal processor. That centralized collection of data can then be effectively analyzed so that system status is known and conclusions for improvement are readily understood using an integrated software. The system, which uses machine learning, also optionally is capable of optimizing operation of the pest control trap and location placement using this system status historical data as well as external data. The goal of the present invention is to not only detect and trap pests; it aims to provide insight on how types and locations of pests relate to the system facility layout and external conditions. This will ultimately increase efficiency and reduce costs and risks.

As an example, the present invention preferably uses a wireless alert sensor, namely trembler switches, to detect the presence of a pest. The switch embodies two metallic elements that are electrically charged using a small battery, creating an analog-type signaling with a small payload (i.e.

6 bytes). When a pest enters the trap, the charged metallic elements connect and complete the circuit, which transmits the signal to an off-site station. In one embodiment, the trap sensor comprises one or more of the devices described in U.S. Patent Application No. 62/443,384, filed Jan. 6, 2017 the content of which is incorporated herein by reference in its entirety. By using simple sensors, which is all that is needed for the present invention to function, a high degree of accuracy and reliability is provided. That is not to say that more advanced sensors could be optionally utilized if desired for any reason. Nonlimiting examples of other sensor options include: bluetooth, RFID, camera, infrared, capacitance, piezoelectric, bioimpedence, motion and/or any possible mechanism known or contemplated hereinafer capable of sensing detection of pests and transmitting the signal to an off-site station.

When a pest is detected by the sensor, that signal is transmitted to a centralized computer preferably with cloud-based network capability. This enables continuous connectivity between the status of the sensors and a central location for easier access on pest control management. The network is responsible for transmitting customized signal data to a database for analysis. Customized signal data refers to selecting only the data that is relevant for analysis. This can be sensor status, location, environmental conditions inside and outside a facility, time of day, types of pest control agents and respective dosages, and any other status that is deemed useful for understanding and optimizing the pest control system and/or reducing cost and risk.

When the signal is transmitted via network to a remote center for analysis, the pertinent data must display in a way that is intuitive for the viewer to quickly understand current status of the pest control system. Specifically, as an example, an indoor map of the facility can identify (using appropriate software), the system status can be displayed by converting the sensor signals into quantitative or qualitative descriptions of how effective the pest control system is designed. In this way, the viewer can make recommendations to manually improve the system by moving traps, changing agents and/or dosage rates, or making temporary or permanent structural changes to the facility itself or its surrounding layout. This software is also capable of generating reports that are helpful for understanding infestation status which is useful to pest control operators, facility managers, and auditors. Finally, this software is machine learning and is fully capable of determining trend analysis and recommendations therefrom. By machine learning, it is intended that the system highly advantageously includes artificial intelligence (AI) that provides the system with the ability to learn without being explicitly programmed. Machine learning focuses on analyzing trends and the development of computer programs that can change when exposed to new data. The process of machine learning is similar to that of data mining, also trend analysis. That is, in accordance with the present invention, most or even all relevant data can be statistically analyzed to influence future facility layouts, geographical locations, types of traps to use, agent types and dosage rates to use, and other elements that can be designed to reduce the infestation of pests. The goal of the software is to continuously optimize the pest control system and make changes to existing systems or influence the design of future systems.

While collecting, analyzing, displaying, and improving the pest control system has intuitive benefit for reducing infestation of a current or future facility, there are major benefits for cost and risk reduction. Optimizing the number, type, and location of the traps reduces cost of purchasing unnecessary traps or placing traps in ineffective locations. Understanding how the type mechanism to use to best control the potential for pests as well as possible dosages, type of barrier or containment, or the like is fully capable with a system of the present invention. This ability reduces cost by ensuring the minimal amount of the correct agent(s) is being utilized throughout a facility and/or the appropriate barrier or remedy is being utilized to maximize results at any given time based on the machine learning capability of the method and system. This is applicable for improving systems already in place and knowing this data also minimizes the trial-and-error approach needed when designing a new facility and its pest control system, which also reduces time, energy, and money for the pest control operation.

There are health and environmental benefits for adopting the present invention. Operators are more informed about types of agent being used and are aware of the traps that need servicing and reduce the exposure to some of the chemicals. For that same reason, the pest control system can be designed to be greener, meaning minimizing specific chemicals released into the environment. The software is also able to learn and recommend changes to the products used in pest control to combat the physiological changes or behavioral resistances to the current system. This learning system will allow benchmarking of the performance for a given product against a given pest. Over time, including a self-learning element, the system can learn to propose products that are best suited against a pest in specific locations.

The machine learning database of the present invention creates a system that is able to be optimized on many specific accounts. The layout of a facility and factors such as where pest resources (i.e. food, water, harborage) are located, allows a written algorithm to determine the optimal number and type of pest sensors to effectively monitor the facility. The aim in more strategically placing sensors reduces costs of unneeded traps and minimizes audit failures for not adequately monitoring pest infestation. And since the system is self-learning, statistical or predictive analysis can achieve a more confident assurance that pest management is optimized depending on conditions, especially to adhere to regulatory standards, thus reducing business risk sensitivity.

A system of the present invention is able to track pesticide use at the level of individual applicators. This is beneficial to determine agent type and dosage that is effective for controlling pests; it can also adjust chemical compositions or concentrations of automatic or manual sprayers by sending a signal to the applicators. A nonlimiting example of a possible arrangement of a suitable digital sprayer to be used in connection with the present invention is disclosed EP 16178766.8 filed 11 Jul. 2016, U.S. Ser. No. 62/360,548 filed 11 Jul. 2016. EP 16178764.3 filed 11 Jul. 2016, U.S. Ser. No. 62/360,555 filed 11 Jul. 2016, and PCT 2016/0255826 published 8 Sep. 2016, the contents of which are all incorporated herein by reference in their entireties.

In some embodiments, the software could signal to applicators, whether automatic or manual, to digitally control the pesticide used and can ensure the amount of pesticide needed is used, thus reducing costs and time. This can be done by either generating a report to personnel or even smart applicators for the sprayer to electronically or manually be aware of how both the type and how much pesticide to install. In terms of human performance, the software is able to track how effective individuals are performing pest control installation and maintenance. Statistical conclusions can be drawn for time and cost for applicators to perform work regarding maintaining the pest control system, which is useful for managers to index or benchmark in an effort to reduce costs and risk. Managers could make personnel changes, implement additional training, or manually improve the process in an effort to reduce the time to maintain the system. The data derived from the software is especially useful for statistical and qualitative analysis so that the current process can be improved and so that implementation of new processes can be implemented with the best practices in place.

The software integrates the pest sensor data with external data to draw additional conclusions about the facility status. Environmental monitors, building maps, facility sensors, and other sensors can be transmitted on the same network to the same remote computing location to be analyzed. Environmental monitors, such as time, temperature, humidity, etc. can be correlated with pest presence, especially comparing that data with data from the pest sensors. Documented operations, like deliveries with building maps, or structural layouts of specific rooms, presence of resources like food, etc. can be compared with data from other sensors to optimize the best layout of a future facility and/or the layout of the pest control system. And facility sensors, like open doors, airflow, indoor temperatures, etc. can provide insight into how those conditions affect pest presence. All of these sensors work harmoniously to understand the entire condition of the building associated with the presence of pests, which is captured by the pest sensors. This also include the integration of external weather and meteorological data which also provides a correlation into the prediction of pest invasion based on an event, series of events or conditions. The ability to use all the harmonious data in a meaningful way is especially powerful for report generation. Given a current or future layout of a facility, pest, environmental, facility sensors and times and types of operations (i.e. delivery of resources), the pest control method in place can be reported. Types, amounts, dates, times can be used to more accurately understand the status of a facility. This is useful for invoicing, inventory management, improving processes, and governmental standard adherence (USDA, EPA, FDA, etc.). The system can automatically schedule supply ordering, request personnel maintenance to a specific location, alert inconsistencies or emergency conditions, and reduce the time needed for auditing a facility as nonlimiting examples of what is envisioned by the present invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 1-8 depict embodiments as described herein.

DETAILED DESCRIPTION OF A PREFERRED EMBODIMENT

Figure 1:
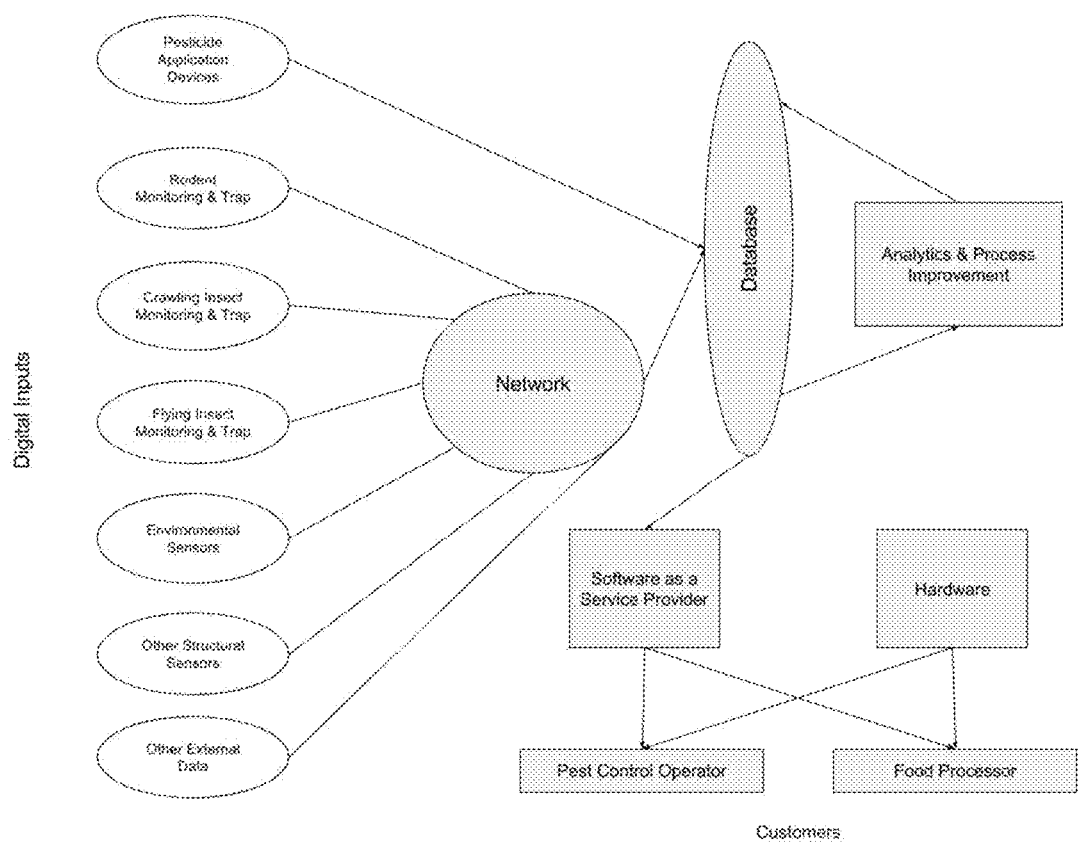

FIG. 1 outlines a suitable flow diagram depicting an embodiment of the present invention.

This management platform is comprised of:

Inputs, which can be from sensors, monitors, integrated devices, or other pest control data collected that can be transferred via communication network.

Network, specifically continuous connectivity between the device inputs into usable data. This is especially useful for this Internet of Things application. This continuous connectivity allows for constant and autonomous detection and monitoring from all pest detection and control inputs across any location.

Database, which is maintained and optimized to display the data in a usable and improvable form. This is especially useful in the aforementioned machine learning process in order to optimize placement of pest control devices and/or systems. This is relevant both for validation of pest control setup and in predictive designs given similar environments, layouts, etc.

Software, allowing for a user interface to display the usable data for the customer in a way that allows the customer to quickly make adjustments to the system, creating a feedback loop that attempts to maximize efficiency; this in turn will attempt to lower costs and risks for the customer by creating a smarter and learnable system for pest control.

Figure 2:
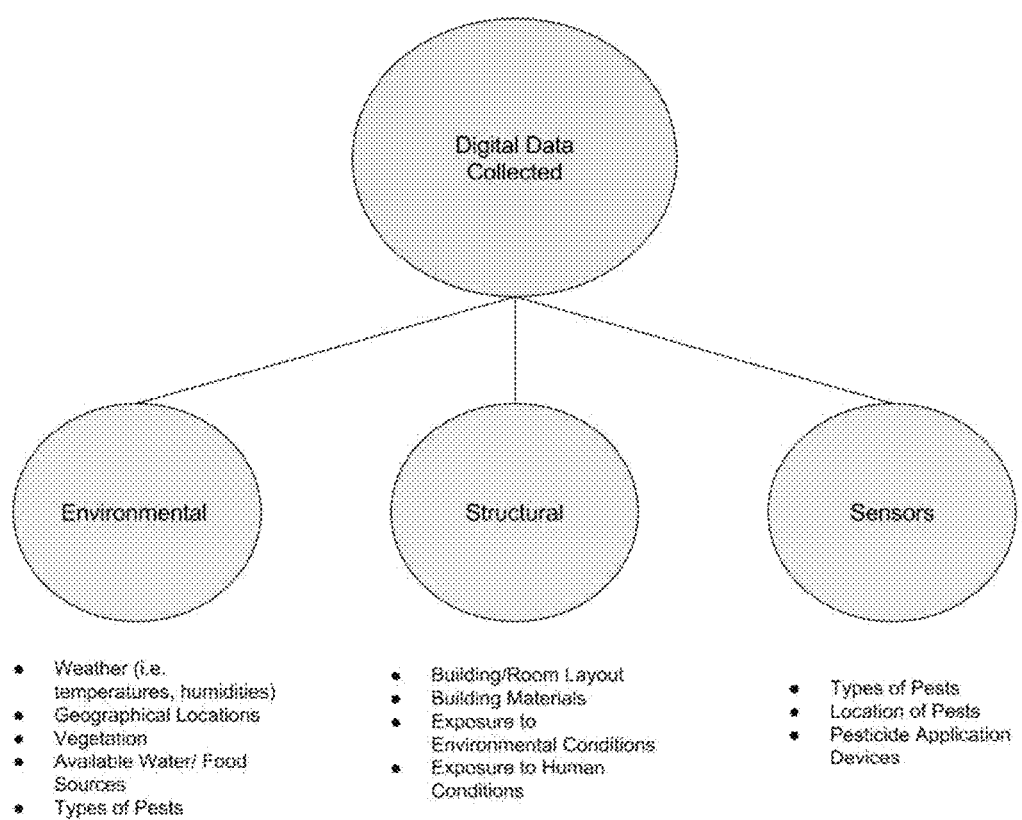

A goal of the platform is to present the customers with improved pest control detection and devices that enable an innovative increase in data collection and analysis. This digitized data, which is outlined in FIG. 2, is valuable to the customer in that more knowledge is known about pest detection. The platforms serves as a product that enables for an increased strategy in pesticide types, locations, dosage rates/times and pest control device types and locations. Thus, the improved ability to understand and analyze how this digital data influences pest type and frequency allows for a more thoughtful pest control design and a reduction in cost and risk to the customer.

The value of data collection is expanded on by an analytical feedback system, which has an even higher value add to the customer. The ability to continuously monitor and change pest control systems improves the efficiency of the systems, thus allowing for the lowered long-term costs of pest control at a particular facility. Furthermore, the machine learning process can be adopted while designing a pest control system for a new facility—considering environmental, structural, and preliminary pest assumptions would also lower the costs and risks associated while installing a pest control system.

As an example, consider a building with insect and rodent infestation. The present invention accounts for detection monitoring and/or traps for both insects and rodents within the structural constraints of the building. Once the system is live, continuous data regarding the type and location of pests is outputted to a usable interface so that traps can be adjusted (i.e. pest hotspots according to the room layout of a building). The present invention also accounts for a compilation of this data to strategically launch a pest control system in a new building—comparing historical data and understanding environmental conditions, structural layouts in FIG. 2 to more efficiency startup a pest control system with an aim to lower costs and risks.

This data-driven and continuously improving system has intuitive benefits to the pest control and food processor customers; it also has benefits relating to the auditing of commercial buildings with respect to pests. The U.S. Food and Drug Administration and Environmental Protection Agency, for example, would have improved confidence of a working system with the advent of the platform, which can generate reports that would indicate the location, type, and number of pests, location, type, and number of traps, and also the effect of building layout, the environmental impact (see FIG. 2) on the type, number, and location of pests. This machine-learning process creates a system that will minimize the pests becoming undetected and/or trapped; it also allows for the rapid display and analysis of the pest control system within a building.

Figure 3:
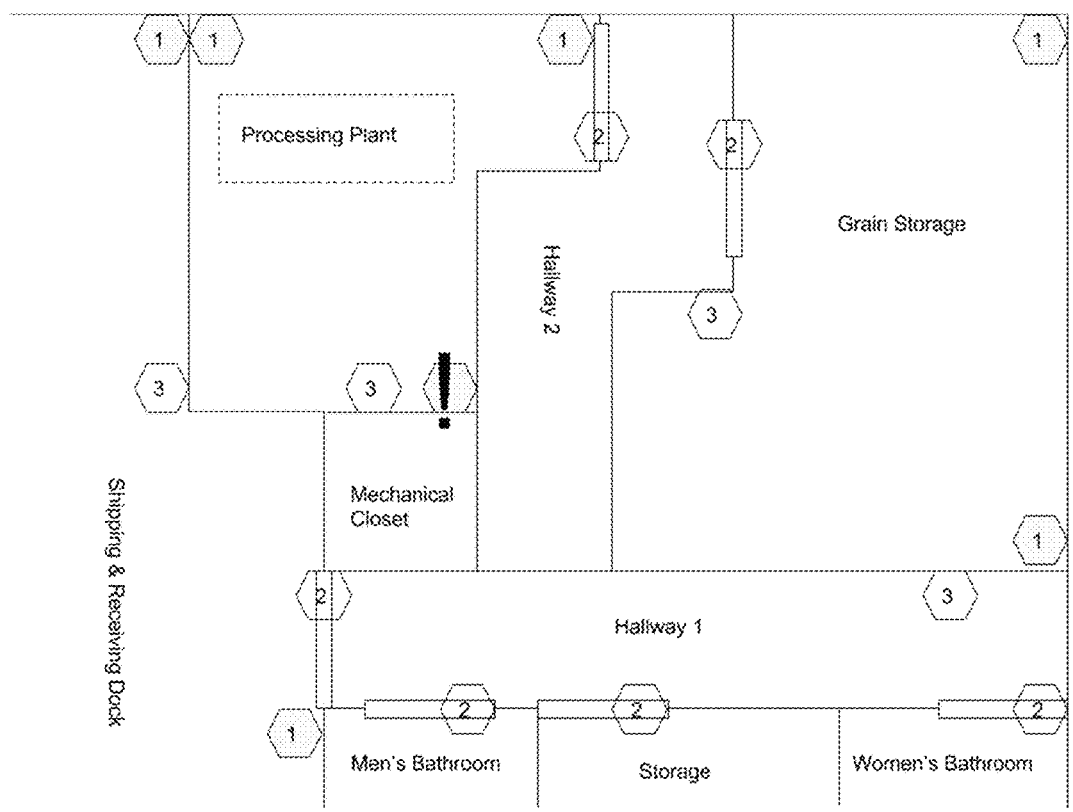

A further example of an existing facility is shown for example in FIG. 3. A representative output of the software includes a layout of a particular facility documenting the location of various sensors. The program would denote environmental sensors 3 that continuously capture time-stamped data on temperature, humidity, airflow, etc. so that the condition of various rooms are understood from a central location. Facility sensors 2 denote actions within the facility that could influence pest presence (i.e. door openings). Various traps are oriented within the facility layout and sensors 1 are shown on the layout so that the status of these sensors are readily available to a central location for analysis.

Figure 4:
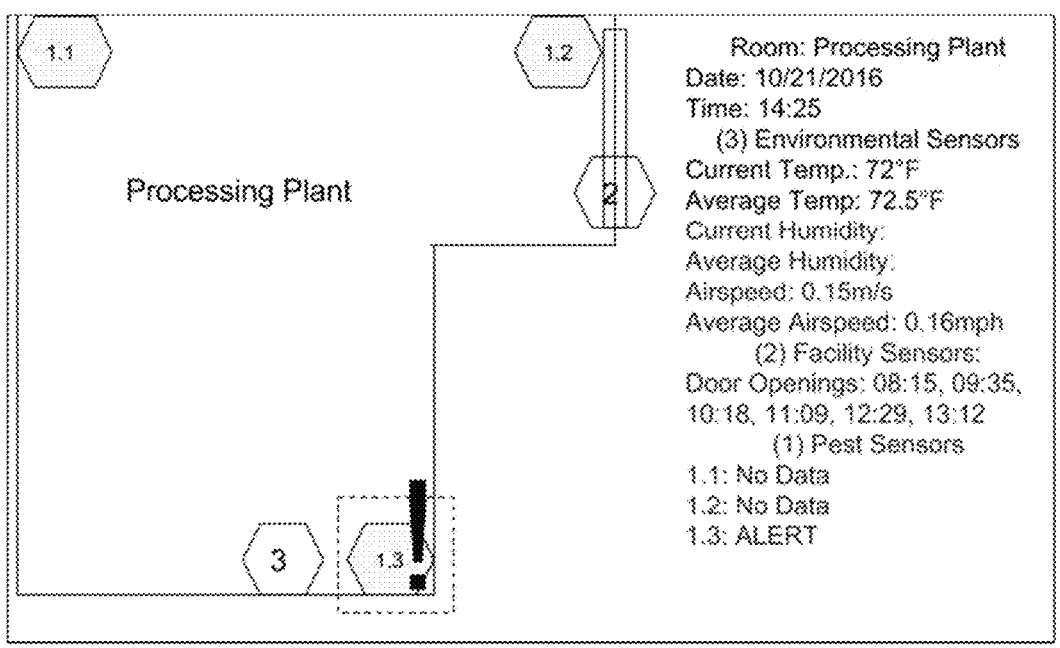

Continuing with the example, consider an alert on a sensor in a particular room of a facility. In FIG. 3, it is understood that there is an alert in the processing plant. The operator is able to investigate this room further and in FIG. 4, the status of the room is quickly understood. Historical and current data is represented in a readable format and the operator can quickly view where the alert is derived. In this example, pest sensor 1.3 indicates an alert and the operator can investigate further to see what triggered the alert and actions for alleviating the problem.

FIG. 5 indicates sensor-specific data regarding the trap that is installed. Continuing with this example, it is apparent that this trap is used to bait and kill cockroaches given with the conditions indicated on the software. The chemical agents, manufacturer, technician are displayed and a description of the alert is displayed for analysis. Based on the continuously learning system, automated or recommended actions are submitted to an appropriate party and the software will indicate how to improve the system to the degree of specificity required.

In connection with the present invention, an important aspect lies in the ability to predict with high certainty high and low risk areas for various levels depending on the type of environment the system would be utilized. Examples of high risk applications include operations where there is any potential for 3rd party audits, retailer audits, FDA inspections, pharmaceutical plants, and the like. Possible lower risk operations include, animal feed, sensitive electronics, hospital/health care, warehouse, transportation and other environments whereby pests are sought to be eradicated but the priority is somewhat lower than environments with adverse consequences.

In accordance with the present invention, the algorithm will look "independently" at the nature of the business operation and/or optionally it will be at the client's discretion whether the business is a high or low risk. Then the algorithm derives the number of traps or needed treatments and locations based on facility size, and independent factors such as the specific business, what its risk is, whether there have been failures in past and the nature of such failures (deficiencies, fines, product withdrawals/recalls).

Alternatively, or in addition, the algorithm can look at dependent factors such as the environment (climate/humidity/population) and actual pest biology/behavior of the pest. For example, the algorithm can be configured such that pest activity (ie a mouse) will be monitored and cataloged over time and then the number or traps and/or locations of treatment can be defined by situational analysis. In an area where no mice have been located in a given time period (ie 12 months), there is a default arrangement. In other areas where there have been maybe 1 mouse/12 months, then there is a +1 to the default in that location. In still yet other areas where there have been observed greater than 1 mouse in 12 mo, then +2 are added to the default.

Furthermore in constructing a situational analysis for placement of traps, the algorithm will do a site assessment to determine a habitual characterization of the location. For example there will be an analysis of habitual features such as whether exterior doors exist and if so how many, failed structural integrity at any location, spilled food, exterior refuse, open water source, canteen/kitchen/break rooms, raw material handling, raw material storage, finished good storage, etc. Micro habitats include proximity to water, food, harborage, and heat. Each of these factors will be assigned a characterization and reference numeral of importance for the algorithm to further calculate and differentiate how placement should be done. For each habitual feature, the algorithm will assign a number of treatment areas and/or traps based on the prioritization from machine learning as data is collected over time for multiple locations.

The risk profile module will then be advantageously based on choices and data already developed recommend a placement for high risk business operations, low risk business operations based on how many failures the business has observed or would be expected to observe based on its criteria (less than 1, equal to 1, or greater than 1). For a high risk area where there has already been 1 failure or 1 failure is predicted from machine learning, the algorithm might suggest 1.5 traps per 100 lin ft., whereas for the same business but not failures have been recorded or would be expected, the algorithm would suggest 1.25 traps per 100 linear ft. If the business was of a low risk as illustrated above, the algorithm would suggest 1.25 traps per 100 linear ft for areas of 1 failure or 1 predicted failure and 1.0 traps per 100 lin ft for areas with no failure or no predicted failure. These recommendations are merely illustrative but give a clear sense of how the inventive algorithm would function to predict a placement design and modifications thereof over time for a given operation.

Figure 6:
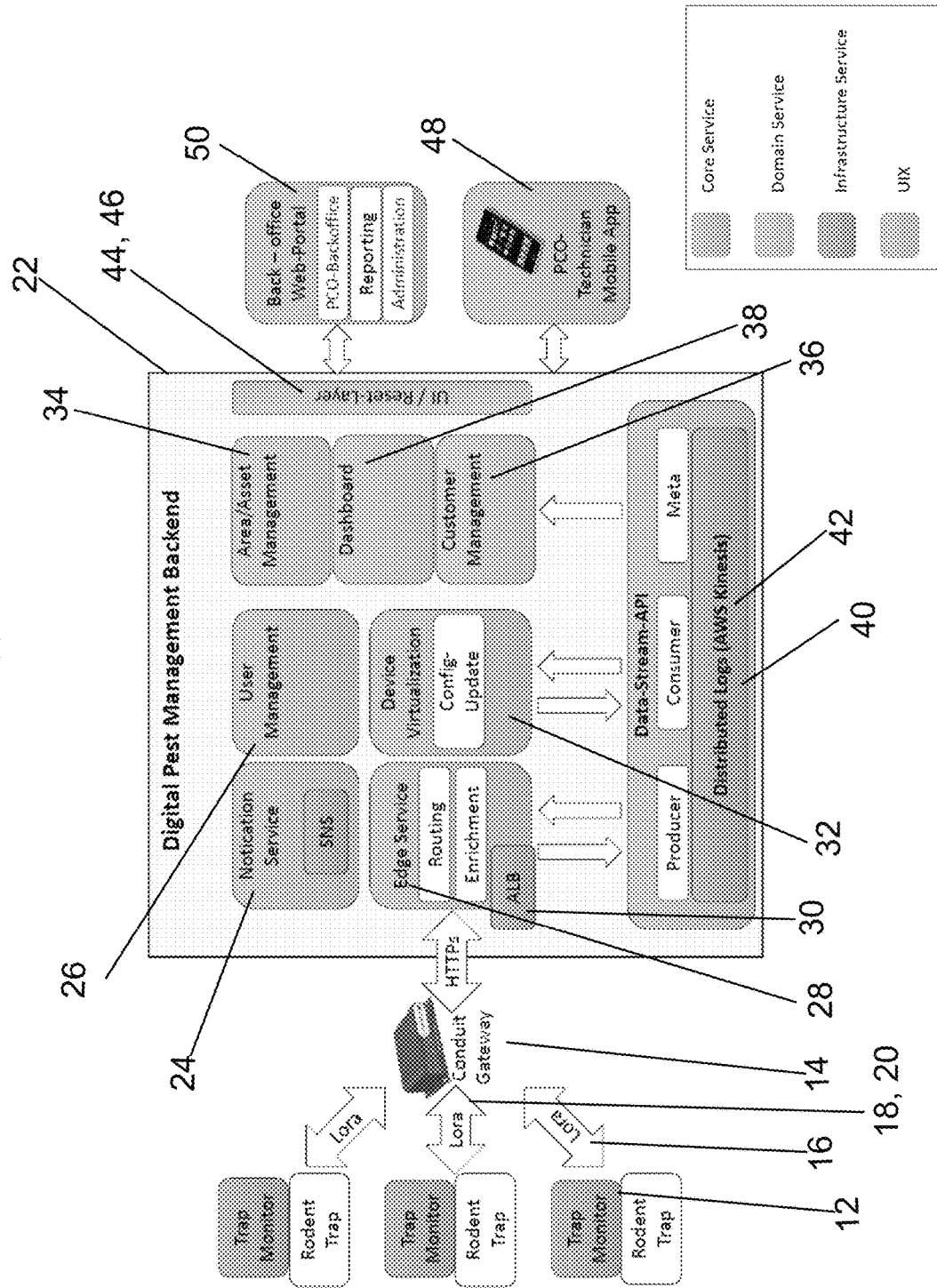

In FIG. 6 there is shown an overview of a system according to the present invention. According to the figure, in one advantageous embodiment, the pest control platform 10 is optionally outfitted with a monitor 12 to transmit a signal to a Conduit Gateway 14, optionally via LoRaWAN 16, a low power wide area network. This mode of telecommunication, as previously described, can be wired or wireless; the Conduit Gateway 14 exists to manage the communications 18 and/or radio frequency modules 20 that are connected to the pest control platform 10. Data is then sent via the Internet to a Digital Pest Management Backend 22, which incorporates customizable services according to the present invention. The Simple Notification System (SNS) 24 allows for automatic notification (i.e. email, text message, integrated mobile application push notification) of an irregularity or even specific system status. A User Management 26 capability is optionally included and serves to add/remove/edit operators as well as view performances. Also as shown in FIG. 6, An Edge Service 28 is advantageously included to allow for control of telecommunication device(s) to also include an Application Load Balancer (ALB) 30 to automatically direct telecommunications traffic based on network availability. The backend 22 also includes a virtualization component 32 intended to optimize computing power of the system 10 as associated with the software that is using that information. The virtual representation of the data storage includes the capability to configure how the system uses the data on an automatic or manual basis.

The other components of the Digital Pest Management Backend 22 enable customization of the facility 34, customer 36, or frontend display 38. The data can also be used to create distributed logs 40, which could be streaming data via any desired mechanism, such as Amazon Web Services (AWS) Kinesis 42. This data log 40, or even streaming data, could be used for auditing, continuous improvement, customer reports, or any other means for fully understanding the historical or even current system.

End-users preferably are be presented the system status based on data in a easily readable format. The User Interface (UI) 44 or Representational State Transfer (REST) 46 creates an advantageous interface that enables interoperability among all the systems via the Internet. The display of the pest management system 10 can be effectively sent to a mobile app for backend display 48 or even to a back-office web portal 50 so that reporting and administrative oversight can be quickly and readily understood by management and/or customers and/or contractors.

EXAMPLES

Figure 7:
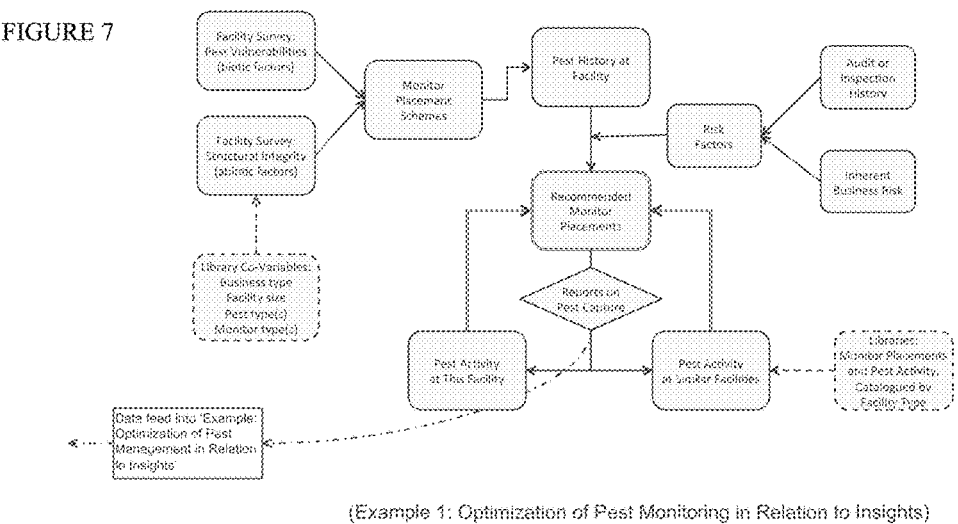

Example 1 depicted in FIG. 7 presents a generalized schematic illustrating how the system is deployed to optimize the monitoring for pest incidence. Each account being monitored is tagged with descriptive features for a facility, such as the nature of the business, its location, the facility size, the type(s) of pests considered or type(s) of monitors deployed. Two site-specific surveys are then completed. One looks to abiotic factors that enable pest incidence in a facility, such as the number of external openings (e.g., doors, loading docks, windows) through which pests could travel. Another looks at biotic factors that sustain pest incidence within a facility, such as open food or water sources. Results of these surveys are run through an algorithm (scheme) to determine the number and placement of pest monitors; for example, one monitor is placed on either side of doors that serve as pest entry points or one monitor is located within a prescribed distance of food and water sources to which pests frequently travel. With a base number of monitor locations thus determined, recent history of pest activity at a facility is cross referenced to increase the number of monitors at locations with a historical record of pest activity. Finally, the user can apply one of two risk quotients to further modify the number of deployed monitors by considering the record of past pest incidents reflected in historical audits or inspections, and a more subjective quotient related to the risk tolerance for the particular business.

The foregoing process will define the recommended placement scheme for monitors within a facility to detect the presence of pests. As the system is operated, and individual pest reports accrue, the system can "learn" and further optimize the placements of pest monitors in response to on-going pest activity within the facility itself or, by drawing from a "library" of monitoring deployment at other facilities with similar businesses, facility size, location, etc. In this way, the number and placement of monitors can be optimized (increased or decreased, or repositioned) to minimize the expense of pest monitoring hardware while keeping pest incidence within acceptable limits set for the facility.

Figure 8:
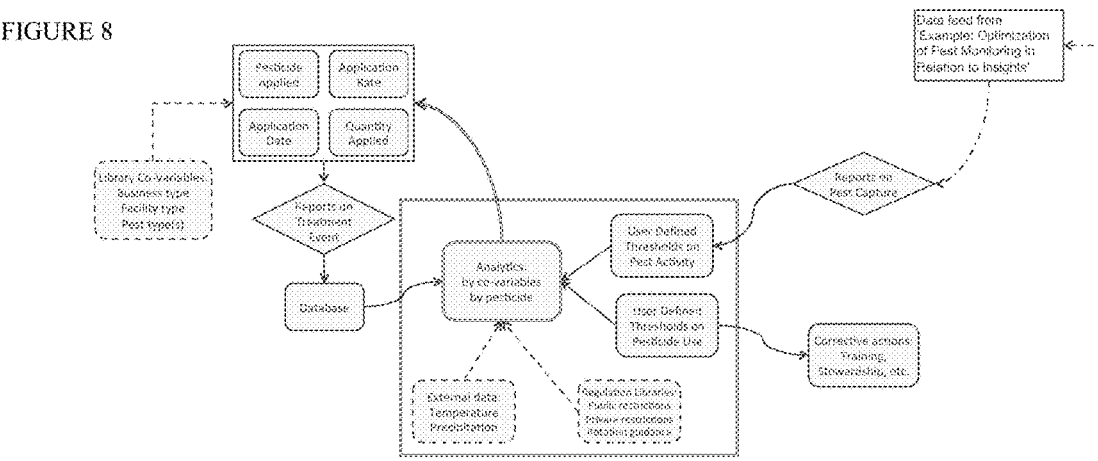

Example 2 depicted in FIG. 8 presents a generalized schematic illustrating how the system is deployed to optimize pest management, in particular the application of pesticide formulations to mitigate pest incidence in a facility.

Each account being serviced is tagged with descriptive features for a facility, such as the nature of the business, its location, the facility size, or the type(s) of pests encountered. At every service, the characteristics of the pesticide application event are recorded, such as on what date was what pesticide applied, at what concentration and in what volume. This treatment event record of the pesticide application is logged into the database for analysis. Analytics performed on the accumulated treatment events are diverse, but any number of examples can capture some of these ideas. In one example, the database can access external databases for temperature and precipitation events at the location and these can be correlated with the frequency of treatment events to learn how weather effects the persistence/efficacy of a particular pesticide used. The system can also be configured to consult various 'libraries' that summarize governmental or private restrictions on when or where a particular pesticide can be used, and can send alerts to a technician (via a connected application devices) to prevent unintentional violations from negatively affecting the compliance record of the pest management firm. A pest management firm may establish a priori thresholds, or conducted a posteriori analysis of treatment events, to flag outliers in treatment events where corrective action is required. For example, by tracking applications by all of their technicians the firm can establish thresholds of application volumes or even service time, say the arithmetic mean $\bar{x}$ plus or minus one standard deviation $Std(x)$. By this means, the firm can identify employees who are applying too much pesticide or who are not spending enough time to properly service the facility. With this insight, the firm can direct employees to training resources to ensure compliance with company standards of service or industry standard practice based in analysis of treatment records for similar facilities from a multitude of companies whose data is in the master database.

In response to an interface with the optimized pest monitoring described in Example 1, the user can establish thresholds for pest incidence that signal the need for a treatment at a facility by a suitable arithmetic formula. Whenever the pest detection system(s) report pest incidence above such thresholds, the optimized pest management system can generate an alert notifying the applicator of the need for an additional service at a facility. The analytics are positioned to modify this need for service alert as follows. A particular product may be recommended if, for example, the time since last service is shorter than expectations.

Based on records of a single firm or from a multitude of firms, the expected duration of pest suppression following a treatment can be established, say the arithmetic mean $\bar{x}$ plus or minus one standard deviation $Std(X)$. Deviation from this threshold could be suggestive of poor performance, either of the applicator, the chemical, or both. There can be a certain tolerance of 67% or maybe 90% of the ideal before the trigger is made to alert an end user.

For each chemical rate R, there is a pest suppression period x. So there is determined the $Std(x)$ and the mean $\bar{x}$.

Over time, the pest suppression is measured, and if it slips below the tolerance, the alert is given as appropriate.

Additionally, to forestall development of physiological resistance in a pest population to a particular pesticide, the user can establish a scheduled rotation between or among different pesticides and the analytics will keep track of sequential use of one pesticide within a facility and recommend the next product to be used in the resistance a management scheme. Poor performance outside of a normative result can also serve to alert the user to a risk for resistance development or other conditions that reduce the effectiveness of the system as a whole.

These examples illustrate how the system can be used to regulate pesticide application events, in terms of the frequency or quality, by delivery data insights. Further, via interactions with an integration to pest alerts derived in a pest monitoring system, the analytics can optionally be altered as desired to optimize pest management in a facility by minimizing the expense and risk associated with pesticide treatments while keeping pest incidence within acceptable limits set for the facility.

The invention claimed is:

1. An integrated digitized pest control management system comprising:
a computer and/or cloud-based network that is adapted to receive multiple data sources and process data therefrom and thereby to create a database;
at least one location specific pest control platform adapted to send and receive data,
wherein said location specific criteria is based at least in part on a risk profile of said location, said platform comprising one or more mechanisms for pest control at said location;
one or more external sensors that collect data external to said pest control platform, said external data comprising one or more of atmospheric conditions, pest populations, human interaction with said location or third party data correlated to predicting likelihood of pests at said location, wherein said database creates a recommended protocol for arrangement for said one or more mechanisms for pest management based on the inputted risk profile of said location and machine learning developed by said database utilizing live data received by said computer as well as historical data from said location, and, further wherein said database continues to collect and integrate new data such that at any given time a recommended protocol for arrangement of said one or more mechanisms is updated on a real time basis, and wherein placement of said one or more mechanisms is increased, decreased or repositioned based on the recommended protocol.

2. The system of claim 1, wherein said location specific pest control platform comprises one or more pesticide applicator devices having an ability to be connected to a network.

3. The system of claim 1, wherein said one or more mechanisms comprising a pest control agent delivery protocol, wherein said pest control agent delivery protocol comprises: a portable device.

4. The system of claim 1, wherein said pest control platform comprises a remote monitoring device with at least one sensor including a trap.

5. The system of claim 4, wherein said remote monitoring device with at least one sensor comprises:
a base comprising a distal end and a proximal end,
a two mode switch comprising a first metallic element and a second metallic element, and a signal unit,
wherein the first metallic element and the second metallic element are electrically separated at the distal end of the base and electrically connected with the signal unit at the proximal end of the base, thereby forming an open circuit, wherein, when the first metallic element contacting the second metallic element, thereby forming a closed circuit, such that the signal unit transmits a signal to an off-site receiver.

6. The system of claim 1 whereby said database uses said live and historical data from locations other than said location to prepare recommended protocol for arrangement for said one or more mechanisms for pest management.

7. The system of claim 1, wherein said location specific pest control platform monitors presence of a pest and identity thereof and data regarding the presence and identity is processed by said database to create instructions to said platform to achieve optimal performance in minimizing impact of said pest.

8. The system of claim 1, wherein said location specific data includes identification of type and/or number of a pest invading said location.

9. A method for simultaneously monitoring and treating a location against pests comprising:
providing a computer and/or cloud based network that is adapted to receive multiple data sources and process data therefrom and thereby to create a database;
inputting location specific criteria including a risk profile associated with said location to create a location specific platform comprising one or more mechanisms for pest control at said location,
inputting data from one or more external sensors that collect data external to said pest control platform, said external data comprising one or more of atmospheric conditions, pest populations, human interaction with said location or third party data correlated to predicting likelihood of pests at said location, wherein said database creates a recommended protocol for arrangement for said one or more mechanisms for pest management based on an inputted risk profile of said location and machine learning developed by said database utilizing live data received by said computer as well as historical data from said location, and further wherein said database continues to collect and integrate new data such that at any given time a recommended protocol for arrangement of said one or more mechanisms is updated on a real time basis, and wherein placement of said one or more mechanisms is increased, decreased or repositioned based on the recommended protocol.

10. The method of claim 9, wherein said location specific pest control platform comprises a pesticide applicator.

11. The method of claim 10, wherein said pesticide applicator comprises: a portable device.

12. The method of claim 9, wherein said one or more mechanisms comprising remote monitoring device, and wherein said remote monitoring device comprises a two mode sensor.

13. The method of claim 12, wherein the two mode sensor comprises:
a base comprising a distal end and a proximal end,
a two mode switch comprising a first metallic element and a second metallic element, and
a signal unit,
wherein the first metallic element and the second metallic element are electrically separated at the distal end of the base and electrically connected with the signal unit at the proximal end of the base, thereby forming an open circuit,
wherein, when the first metallic element contacting the second metallic element, thereby forming a closed circuit, such that the signal unit transmits a signal to an off-site receiver.

* * * * *